United States Patent
Zhang et al.

(10) Patent No.: US 11,579,835 B2
(45) Date of Patent: Feb. 14, 2023

(54) MULTIMEDIA DATA PLAYING METHOD AND TERMINAL DEVICE

(71) Applicant: HUAWEI TECHNOLOGIES CO., LTD., Guangdong (CN)

(72) Inventors: Wenyang Zhang, Shanghai (CN); Hao Liu, Shanghai (CN); Xinggang Gu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/474,596

(22) PCT Filed: Dec. 29, 2016

(86) PCT No.: PCT/CN2016/113091
§ 371 (c)(1),
(2) Date: Jun. 28, 2019

(87) PCT Pub. No.: WO2018/119903
PCT Pub. Date: Jul. 5, 2018

(65) Prior Publication Data
US 2019/0324717 A1     Oct. 24, 2019

(51) Int. Cl.
*G06F 3/16*       (2006.01)
*G06F 3/0482*     (2013.01)
*G06F 3/04847*    (2022.01)

(52) U.S. Cl.
CPC ............ *G06F 3/165* (2013.01); *G06F 3/0482* (2013.01); *G06F 3/04847* (2013.01)

(58) Field of Classification Search
CPC ........ G06F 3/16; G06F 3/0482; G06F 3/0484; G06F 3/04847; G06F 3/165
See application file for complete search history.

(56) References Cited

U.S. PATENT DOCUMENTS 8,085,269 B1 * 12/2011 Classen .................. G11B 27/34
                                                     381/119
8,165,308 B2    4/2012 Norhammar et al.
(Continued)

FOREIGN PATENT DOCUMENTS

CN    102025831 A    4/2011
CN    103646656 A    3/2014
(Continued)

OTHER PUBLICATIONS

Abbas Suterwala, "Managing Multiple Sound Sources in Android with Audio Focus Requesting Audio Focus-Requesting Audio Focus for Your App" XP055554978, May 27, 2016, 7 pages.
(Continued)

*Primary Examiner* — William L Bashore
*Assistant Examiner* — Gregory A Distefano
(74) *Attorney, Agent, or Firm* — Fish & Richardson P.C.

(57) ABSTRACT

The present disclosure relates to multimedia data playing methods and terminal devices. One example method includes obtaining, by a terminal device, a first sound effect plug-in, where the first sound effect plug-in corresponds to a first sound effect, and the terminal device includes a first application and a second application that are used to play multimedia data, receiving, by the terminal device, a first instruction used to indicate that a user of the terminal device selects the first sound effect option, wherein where the first sound effect option is an option corresponding to the first sound effect, when first multimedia data is to be played by the first application or the second application, processing, by the terminal device, the first multimedia data by using the first sound effect plug-in according to the first instruction to play the first multimedia data with the first sound effect.

20 Claims, 12 Drawing Sheets

(56) References Cited

U.S. PATENT DOCUMENTS

| | | | |
|---|---|---|---|
| 2002/0099552 A1* | 7/2002 | Rubin | G09F 27/00 704/270 |
| 2005/0246163 A1 | 11/2005 | Ono et al. | |
| 2005/0257228 A1* | 11/2005 | Ono | G06F 3/16 719/331 |
| 2006/0029234 A1 | 2/2006 | Sargaison | |
| 2007/0021145 A1* | 1/2007 | Lam | H04M 1/72563 455/556.1 |
| 2010/0083116 A1* | 4/2010 | Akifusa | G06F 3/04847 715/727 |
| 2010/0119084 A1 | 5/2010 | Mussel | |
| 2013/0089208 A1* | 4/2013 | Fairey | H04R 5/04 381/17 |
| 2013/0291708 A1* | 11/2013 | Orshan | G10H 1/0008 84/626 |
| 2017/0025105 A1 | 1/2017 | Ou et al. | |
| 2017/0060520 A1* | 3/2017 | Cohen | H04L 67/01 |
| 2018/0091926 A1* | 3/2018 | Cho | G06F 3/0482 |
| 2019/0146749 A1 | 5/2019 | Li et al. | |

FOREIGN PATENT DOCUMENTS

| | | |
|---|---|---|
| CN | 104090766 A | 10/2014 |
| CN | 104281432 A | 1/2015 |
| CN | 105681821 A | 6/2016 |
| CN | 105827849 A | 8/2016 |
| CN | 106095386 A | 11/2016 |
| CN | 106126171 A | 11/2016 |
| CN | 106126172 A | 11/2016 |
| CN | 106205658 A | 12/2016 |
| CN | 106251876 A | 12/2016 |
| EP | 1326228 A1 | 7/2003 |

OTHER PUBLICATIONS

Extended European Search Report issued in European Application No. 16925605.4 dated Nov. 29, 2019, 9 pages.

PCT International Search Report and Written Opinion issued in International Application No. PCT/CN2016/113091 dated Aug. 25, 2017, 15 pages.

Office Action issued in Chinese Application No. 201680059510.3 dated Apr. 28, 2019, 5 pages.

Office Action issued in Australian Application No. 2016434529 dated Apr. 1, 2021, 4 pages.

EPO Summons to attend oral proceedings pursuant to Rule 115(1) EPC issued in European Application No. 16925605.4 dated May 6, 2022, 10 pages.

* cited by examiner

MULTIMEDIA DATA PLAYING METHOD AND TERMINAL DEVICE

CROSS-REFERENCE TO RELATED APPLICATIONS

This application is a national stage of International Application No. PCT/CN2016/113091, filed on Dec. 29, 2016, which is hereby incorporated by reference in its entirety.

TECHNICAL FIELD

Embodiments of the present invention relate to the terminal field, and in particular, to a multimedia data playing method and a terminal device.

BACKGROUND

Currently, there are a plurality of sound effect libraries, such as a Dolby sound effect library, a digital theater system (Digital Theater System, DTS) sound effect library, a super wide sound (Super Wide Sound, SWS) library, and a Harman sound effect library. These sound effect libraries are provided by professional sound effect processing companies. Generally, each mobile phone operating system is integrated with only one sound effect library, and the sound effect library is integrated into the mobile phone operating system in a form of a sound effect file. Because sound effect files of various mobile phone operating systems are different, a mobile phone operating system integrated with one sound effect library cannot be compatible with a sound effect library of another mobile phone operating system. If a plurality of sound effect libraries are integrated into one mobile phone operating system, the plurality of sound effect libraries are usually isolated from each other by using a compilation macro. This manner affects a sound effect file, is not versatile to all mobile phone operating systems, and has a negative effect on subsequent maintenance efficiency and a subsequent production process speed of the mobile phone operating system.

In addition, playing applications such as QQ music and Baidu music that have sound effect experience are increasing. However, a sound effect added to such an application cannot be extended to another application.

SUMMARY

Embodiments of the present invention provide a multimedia data playing method and a terminal device, so that a sound effect added to a specific application can be extended to another application.

According to a first aspect, a multimedia data playing method is provided. A terminal device obtains a first sound effect plug-in, where the first sound effect plug-in corresponds to a first sound effect, and the terminal device includes a first application and a second application that are used to play multimedia data. The terminal device provides a first sound effect option corresponding to the first sound effect, for selection by a user. The terminal device receives a first instruction used to indicate that the user selects the first sound effect option. When first multimedia data is to be played by the first application, the terminal device processes the first multimedia data by using the first sound effect plug-in according to the first instruction, to play the first multimedia data with the first sound effect. When second multimedia data is to be played by the second application, the terminal device processes the second multimedia data by using the first sound effect plug-in according to the first instruction, to play the second multimedia data with the first sound effect.

In this embodiment of the present invention, the terminal device provides the first sound effect option corresponding to the first sound effect, for selection by the user, and enables, according to the first instruction indicating that the user selects the first sound effect option, the first sound effect to take effect in different applications. If the first sound effect is a sound effect added to a specific application, the sound effect can also be extended to another application, in other words, the user can experience a global sound effect.

In a possible implementation, the terminal device obtains the first sound effect plug-in from outside; or the terminal device obtains the first sound effect plug-in from a third application. In this implementation, the terminal device may obtain the first sound effect plug-in in flexible and diverse manners, so that the user can obtain wider sound effect experience.

In a possible implementation, when processing the first multimedia data or the second multimedia data by using the first sound effect plug-in, the terminal device receives a sound effect switching instruction used to select a second sound effect, where the terminal device includes a second sound effect plug-in corresponding to the second sound effect; and the terminal device processes the first multimedia data or the second multimedia data by using the second sound effect plug-in according to the sound effect switching instruction, to play the first multimedia data or the second multimedia data with the second sound effect. In this implementation, when playing the multimedia data with a sound effect, the terminal device may play the multimedia data with another sound effect according to the sound effect switching instruction.

In a possible implementation, the terminal device receives a parameter setting instruction from the user, where the parameter setting instruction is used to set a sound effect parameter value; and the terminal device updates a sound effect parameter value in the first sound effect plug-in according to the parameter setting instruction. In this implementation, a sound effect parameter value in a sound effect plug-in may be set by the user, so that a sound effect of the multimedia data processed by using the sound effect plug-in more meets a user requirement.

In a possible implementation, the terminal device detects that a current routing mode is a speaker mode or a headset mode, and adjusts the sound effect parameter value in the first sound effect plug-in based on the routing mode. In this implementation, the terminal device adjusts a sound effect parameter value in a sound effect plug-in based on the routing mode, to make a sound effect adapt to the routing mode.

In a possible implementation, the terminal device receives a sound effect enabling/disabling instruction from the user; and the terminal device enables or disables the first sound effect plug-in according to the sound effect enabling/disabling instruction. In this implementation, when playing the multimedia data, the terminal device may enable or disable the first sound effect plug-in according to the sound effect enabling/disabling instruction from the user, to meet a change of a user requirement for a sound effect.

In a possible implementation, after disabling the first sound effect plug-in, the terminal device plays multimedia data by using a default sound effect. In this implementation, the default sound effect may be set based on a general requirement of the user for the sound effect, to ensure that the multimedia data can still be played with a desired effect after the terminal device disables the first sound effect plug-in.

In a possible implementation, when processing the first multimedia data or the second multimedia data by using the first sound effect plug-in, the terminal device receives a sound effect destruction instruction from the user; the terminal device deletes the first sound effect plug-in according to the sound effect destruction instruction; and the terminal device processes the first multimedia data or the second multimedia data by using a third sound effect plug-in. In this implementation, after a currently used sound effect plug-in is deleted, the multimedia data is processed by using a default sound effect plug-in, so that the multimedia data is still played with a desired effect after the sound effect plug-in is deleted.

In a possible implementation, when processing the first multimedia data or the second multimedia data by using the first sound effect plug-in, the terminal device receives a sound effect destruction instruction from the user; the terminal device confirms that audio data playing on the first application ends; and the terminal device deletes the first sound effect plug-in according to the sound effect destruction instruction. In this implementation, when receiving the sound effect destruction instruction from the user, the terminal device does not immediately delete the first sound effect plug-in, but first confirms that audio data playing that uses the first sound effect plug-in ends, and then deletes the first sound effect plug-in, to ensure continuity of a sound effect during the audio data playing.

According to a second aspect, a terminal device is provided, including: an obtaining unit, configured to obtain a first sound effect plug-in, where the first sound effect plug-in corresponds to a first sound effect; a storage unit, configured to store a first application and a second application that are used to play multimedia data; a selection unit, configured to provide a first sound effect option corresponding to the first sound effect, for selection by a user; a receiving unit, configured to receive a first instruction used to indicate that the user selects the first sound effect option provided by the selection unit; and a processing unit, configured to: when first multimedia data is to be played by the first application stored in the storage unit, process, according to the first instruction received by the receiving unit, the first multimedia data by using the first sound effect plug-in obtained by the obtaining unit, to play the first multimedia data with the first sound effect, where the processing unit is further configured to: when second multimedia data is to be played by the second application stored in the storage unit, process, according to the first instruction received by the receiving unit, the second multimedia data by using the first sound effect plug-in obtained by the obtaining unit, to play the second multimedia data with the first sound effect.

In a possible implementation, the obtaining unit is specifically configured to: obtain the first sound effect plug-in from outside of the terminal device; or obtain the first sound effect plug-in from a third application.

In a possible implementation, the receiving unit is further configured to: when the processing unit processes the first multimedia data or the second multimedia data by using the first sound effect plug-in, receive a sound effect switching instruction used to select a second sound effect; the storage unit is further configured to store a second sound effect plug-in corresponding to the second sound effect; and the processing unit is further configured to process, according to the sound effect switching instruction received by the receiving unit, the first multimedia data or the second multimedia data by using the second sound effect plug-in stored in the storage unit, to play the first multimedia data or the second multimedia data with the second sound effect.

In a possible implementation, the receiving unit is further configured to receive a parameter setting instruction from the user, where the parameter setting instruction is used to set a sound effect parameter value; and the processing unit is further configured to update a sound effect parameter value in the first sound effect plug-in according to the parameter setting instruction received by the receiving unit.

In a possible implementation, the terminal device further includes a detection unit, configured to detect that a current routing mode is a speaker mode or a headset mode; and the processing unit is further configured to adjust the sound effect parameter value in the first sound effect plug-in based on the routing mode detected by the detection unit.

In a possible implementation, the receiving unit is further configured to receive a sound effect enabling/disabling instruction from the user; and the processing unit is further configured to enable or disable the first sound effect plug-in according to the sound effect enabling/disabling instruction received by the receiving unit.

In a possible implementation, the processing unit is further configured to play multimedia data by using a default sound effect after disabling the first sound effect plug-in.

In a possible implementation, the receiving unit is further configured to: when the processing unit processes the first multimedia data or the second multimedia data by using the first sound effect plug-in, receive a sound effect destruction instruction from the user; the processing unit is further configured to delete the first sound effect plug-in according to the sound effect destruction instruction received by the receiving unit; and the processing unit is further configured to process the first multimedia data or the second multimedia data by using a third sound effect plug-in.

In a possible implementation, the receiving unit is further configured to: when the processing unit processes the first multimedia data or the second multimedia data by using the first sound effect plug-in, receive a sound effect destruction instruction from the user; the processing unit is further configured to confirm that audio data playing on the first application ends; and the processing unit is further configured to delete the first sound effect plug-in according to the sound effect destruction instruction.

According to another aspect, an embodiment of the present invention provides a terminal device. The terminal device can implement a function implemented by the terminal device in the foregoing method example. The function may be implemented by hardware, or may be implemented by hardware by executing corresponding software. The hardware or the software includes one or more modules corresponding to the function.

In a possible design, a structure of the terminal device includes a processor and a communications interface. The processor is configured to support the terminal device in implementing the corresponding function in the foregoing method. The communications interface is configured to support communication between the terminal device and another network element, or receive an indication from a user. The terminal device may further include a storage. The storage is configured to be coupled to the processor, and stores a necessary program instruction and data of the terminal device. The terminal device may further include an input device. The input device is configured to be coupled to the processor, and receives an instruction entered by the user, or the like. The terminal device may further include a display. The display is configured to be coupled to the processor, and displays a sound effect option or the like.

According to still another aspect, an embodiment of the present invention provides a computer storage medium, configured to store a computer software instruction used by the foregoing terminal device, and the computer software instruction includes a program designed for performing the foregoing aspects.

In the embodiments of the present invention, the terminal device provides the first sound effect option corresponding to the first sound effect, for selection by the user, and enables, according to the first instruction indicating that the user selects the first sound effect option, the first sound effect to take effect in different applications. If the first sound effect is a sound effect added to a specific application, the sound effect can also be extended to another application, in other words, the user can experience a global sound effect.

DESCRIPTION OF EMBODIMENTS

To make the objectives, technical solutions, and advantages of the embodiments of the present invention clearer, the following describes the technical solutions of the embodiments of the present invention with reference to the accompanying drawings in the embodiments of the present invention.

Figure 1A:
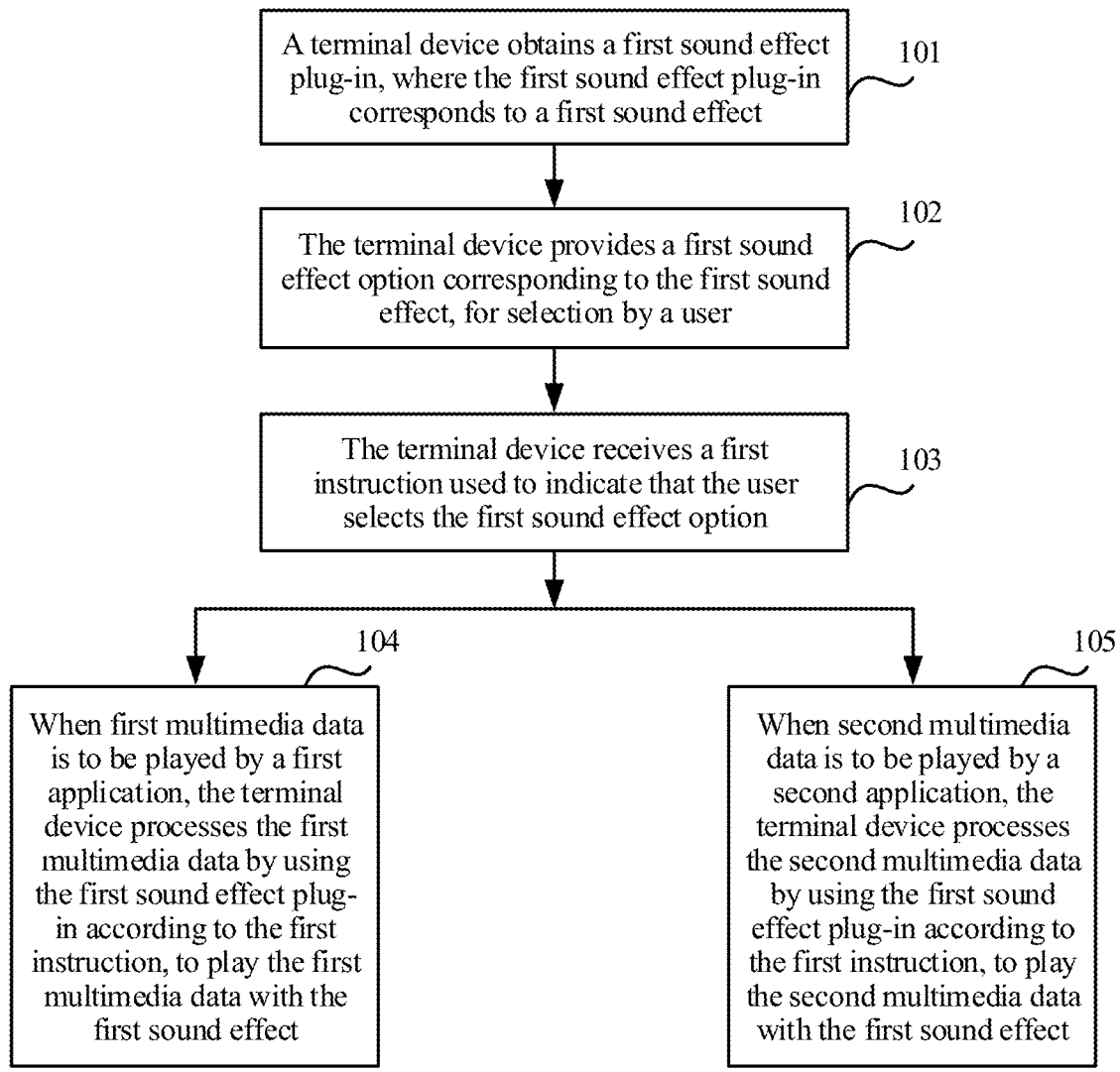
FIG. 1A is a flowchart of a multimedia data playing method according to an embodiment of the present invention.

FIG. 1A is a flowchart of a multimedia data playing method according to an embodiment of the present invention. The method may be performed by a terminal device such as a mobile phone, and the method includes the following steps.

Step 101: The terminal device obtains a first sound effect plug-in, where the first sound effect plug-in corresponds to a first sound effect.

It should be understood that in this embodiment of the present invention, the terminal device may be referred to as a terminal, user equipment (User Equipment, "UE" for short), a mobile station (Mobile Station, "MS" for short), a mobile terminal (Mobile Terminal), a computer, a microcomputer, or the like. The terminal device may communicate with one or more core networks by using a radio access network (Radio Access Network, "RAN" for short). For example, the terminal device may be a mobile phone (or referred to as a "cellular" phone) or a computer having a mobile terminal. For example, the terminal device may also be a portable, pocket-sized, handheld, computer built-in, or in-vehicle mobile apparatus that exchanges voice and/or data with the radio access network. This is not limited in this embodiment of the present invention. For example, the terminal device further includes a wired-access terminal device with a multi-carrier feature.

In an example, the terminal device includes a first application and a second application that are used to play multimedia data. A quantity of applications included in the terminal device is not limited in this embodiment of the present invention, and the terminal device may include two, three, or more applications.

The multimedia data includes audio and a video. When a video is to be played, audio data in the video may be processed by using a sound effect plug-in.

The sound effect may be a sound effect corresponding to an existing sound effect library, such as a Dolby sound effect described in the background technology, or may be a sound effect developed by an application developer.

In an example, after obtaining the first sound effect plug-in, the terminal device further registers the first sound effect plug-in, that is, stores a handle of the first sound effect plug-in, so as to subsequently use the first sound effect plug-in to process the multimedia data by using the handle of the first sound effect plug-in.

In an example, the terminal device may obtain the first sound effect plug-in in any one of the following manners:

Manner 1: The terminal device obtains the first sound effect plug-in from outside.

The terminal device may obtain the first sound effect plug-in from an application market, or a terminal manufacturer may directly push the first sound effect plug-in to the terminal device, or the terminal device may copy and obtain the first sound effect plug-in by using a secure digital memory (Secure Digital Memory, SD) card.

Manner 2: The terminal device obtains the first sound effect plug-in from a third application.

The third application may be an application pre-installed in the mobile phone or an application that has been downloaded by a user. It may be understood that the third application may be the first application or the second application. In other words, a plug-in obtained from one application may be used for another application.

Step 102: The terminal device provides a first sound effect option corresponding to the first sound effect, for selection by a user.

In this embodiment of the present invention, a sound effect option may appear on the first application or the second application after the first application or the second application is opened; or a sound effect option may appear on a specific screen after the terminal device obtains the first sound effect plug-in, and this sound effect may be used for all audio data to be played.

Step 103: The terminal device receives a first instruction used to indicate that the user selects the first sound effect option.

Step 104: When first multimedia data is to be played by a first application, the terminal device processes the first multimedia data by using the first sound effect plug-in according to the first instruction, to play the first multimedia data with the first sound effect.

It may be understood that processing on the multimedia data by using a sound effect plug-in is equivalent to filtering processing, and may be, but is not limited to: frequency processing and/or volume processing, to achieve a corresponding effect such as a surround sound.

Step 105: When second multimedia data is to be played by a second application, the terminal device processes the second multimedia data by using the first sound effect plug-in according to the first instruction, to play the second multimedia data with the first sound effect.

In an example, when processing the first multimedia data or the second multimedia data by using the first sound effect plug-in, the terminal device receives a sound effect switching instruction used to select a second sound effect, where the terminal device includes a second sound effect plug-in corresponding to the second sound effect; and the terminal device processes the first multimedia data or the second multimedia data by using the second sound effect plug-in according to the sound effect switching instruction, to play the first multimedia data or the second multimedia data with the second sound effect.

In an example, the terminal device receives a parameter setting instruction from the user, where the parameter setting instruction is used to set a sound effect parameter value; and the terminal device updates a sound effect parameter value in the first sound effect plug-in according to the parameter setting instruction. The sound effect plug-in includes a sound effect parameter, and the sound effect parameter value may be set. It may be understood that the terminal device may receive the parameter setting instruction from the user when processing the multimedia data by using the first sound effect plug-in, or the terminal device may receive the parameter setting instruction from the user before processing the multimedia data by using the first sound effect plug-in.

In an example, the terminal device detects that a current routing mode is a speaker mode or a headset mode, and adjusts the sound effect parameter value in the first sound effect plug-in based on the routing mode, to make a sound effect adapt to the routing mode.

In an example, the terminal device receives a sound effect enabling/disabling instruction from the user; and the terminal device enables or disables the first sound effect plug-in according to the sound effect enabling/disabling instruction. Sound effect enabling/disabling may be to enable or disable all sound effects, or to disable only a currently used sound effect.

In an example, after disabling the first sound effect plug-in, the terminal device plays multimedia data by using a default sound effect. The default sound effect may be a sound effect integrated into an operating system, or may be a sound effect added to an application.

In an example, when processing the first multimedia data or the second multimedia data by using the first sound effect plug-in, the terminal device receives a sound effect destruction instruction from the user; the terminal device deletes the first sound effect plug-in according to the sound effect destruction instruction; and the terminal device processes the first multimedia data or the second multimedia data by using a third sound effect plug-in. Deleting a sound effect plug-in includes not only deleting information about the sound effect plug-in from a registry, but also deleting the sound effect plug-in itself. After a currently used sound effect plug-in is deleted, the multimedia data is processed by using the default third sound effect plug-in, to ensure a playing effect of the multimedia data.

In an example, when processing the first multimedia data or the second multimedia data by using the first sound effect plug-in, the terminal device receives a sound effect destruction instruction from the user; the terminal device confirms that audio data playing on the first application ends; and the terminal device deletes the first sound effect plug-in according to the sound effect destruction instruction. In this example, when receiving the sound effect destruction instruction from the user, the terminal device does not immediately delete the first sound effect plug-in, but first confirms that audio data playing that uses the first sound effect plug-in ends, and then deletes the first sound effect plug-in, to ensure continuity of a sound effect during the audio data playing.

Figure 1B:
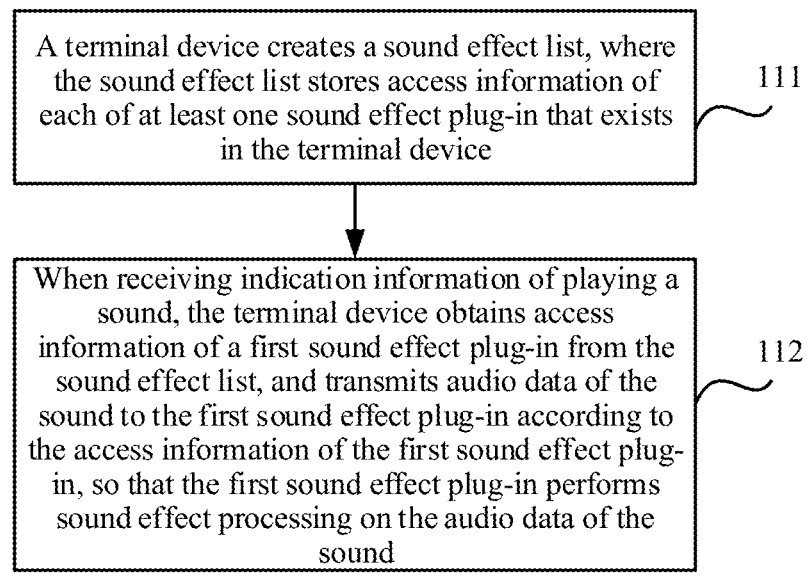
FIG. 1B is a flowchart of another multimedia data playing method according to an embodiment of the present invention.

FIG. 1B is a flowchart of another multimedia data playing method according to an embodiment of the present invention. The method may be performed by a terminal device such as a mobile phone, and the method includes the following steps.

Step 111: The terminal device creates a sound effect list, where the sound effect list stores access information of each of at least one sound effect plug-in that exists in the terminal device.

In an example, when the terminal device is powered on, an application layer of the terminal device registers the existing at least one sound effect plug-in with a system layer of the terminal device, and the system layer of the terminal device stores a handle of each of the at least one sound effect plug-in in the sound effect list. A handle of a sound effect plug-in is specific access information of the sound effect plug-in. The sound effect list may correspondingly store a sound effect identifier corresponding to a sound effect plug-in and a handle of the sound effect plug-in, and a specific form of the sound effect list may be shown in Table 1.

TABLE 1

| Sound Effect Identifier | Handle of a Sound Effect Plug-in |
|---|---|
| Sound effect A | Handle 1 |
| Sound effect B | Handle 2 |
| Sound effect C | Handle 3 |

It may be learned from Table 1 that the application layer of the terminal device registers a sound effect A, a sound effect B, and a sound effect C during power on; and a handle of a sound effect plug-in corresponding to the sound effect A is a handle 1, a handle of a sound effect plug-in corresponding to the sound effect B is a handle 2, and a handle of a sound effect plug-in corresponding to the sound effect C is a handle 3.

In another example, a sound effect plug-in is not registered when the terminal device is powered on, but when an application program runs at an application layer of the terminal device, a sound effect plug-in belonging to the application program is registered with a system layer of the terminal device, and the system layer of the terminal device stores a handle of the sound effect plug-in in the sound effect list. For example, the application layer of the terminal device has sound effect plug-ins corresponding to a sound effect A, a sound effect B, and a sound effect C, where the sound effect A belongs to an application program 1, and the sound effect B and the sound effect C belong to an application program 2. When the application program 1 runs, a sound effect plug-in corresponding to the sound effect A is registered, and when the application program 2 runs, a sound effect plug-in corresponding to the sound effect B and a sound effect plug-in corresponding to the sound effect C are registered.

Step 112: When receiving indication information of playing a sound, the terminal device obtains access information of a first sound effect plug-in from the sound effect list, and transmits audio data of the sound to the first sound effect plug-in based on the access information of the first sound effect plug-in, so that the first sound effect plug-in performs sound effect processing on the audio data of the sound.

In an example, when the terminal device receives the indication information of playing a sound, the application layer of the terminal device transmits the audio data of the sound to the system layer of the terminal device, and the system layer of the terminal device obtains a handle of the first sound effect plug-in from the sound effect list, and transmits the audio data of the sound to the first sound effect plug-in based on the handle of the first sound effect plug-in, so that the first sound effect plug-in performs sound effect processing on the audio data of the sound.

According to a sound effect processing method provided in this embodiment of the present invention, the sound effect list is created to store the access information of each of the at least one sound effect plug-in that exists in the terminal device, and when receiving the indication information of playing a sound, the terminal device may obtain the access information of the first sound effect plug-in from the sound effect list, and transmit the audio data of the sound to the first sound effect plug-in based on the access information of the first sound effect plug-in, so that the first sound effect plug-in performs sound effect processing on the audio data of the sound. If the first sound effect plug-in is a sound effect added to a specific application, the sound effect can also be extended to take effect as a global sound effect, so that the user can experience the global sound effect.

In addition, in this embodiment of the present invention, the sound effect list may be updated at any time based on an increase or a decrease of a sound effect plug-in. In an example, after the system layer of the terminal device stores the handle of each of the at least one sound effect plug-in in the sound effect list, when a new sound effect plug-in is added to the application layer of the terminal device, the application layer of the terminal device registers the newly added sound effect plug-in with the system layer of the terminal device, and the system layer of the terminal device stores a handle of the newly added sound effect plug-in in the sound effect list.

There may be a plurality of sound effect plug-ins in the sound effect list. Therefore, before sound effect processing is performed on the sound, one sound effect plug-in needs to be selected from the plurality of sound effect plug-ins to perform sound effect processing on the sound. In an example, before step 112, the system layer of the terminal device determines a sound effect plug-in in the sound effect list as the first sound effect plug-in, so that the first sound effect plug-in subsequently performs sound effect processing on the sound in step 112.

In this embodiment of the present invention, a sound effect plug-in may be selected from the sound effect list as the first sound effect plug-in based on an indication from the user, and the first sound effect plug-in is recorded, so that the recorded first sound effect plug-in can be directly used to process a sound without user selection. Alternatively, based on a type of a sound to be played, a sound effect plug-in may be selected from the sound effect list as the first sound effect plug-in according to a preset rule.

Figure 2:
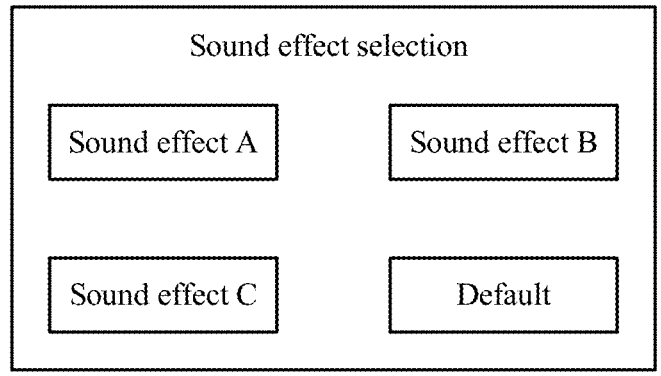
FIG. 2 is a schematic diagram of a sound effect selection screen according to an embodiment of the present invention.

In a specific application scenario, when the mobile phone receives, from the user, an indication of playing an audio file, a sound effect selection screen is displayed on a display screen of the mobile phone. A specific form of the sound effect selection screen may be, but is not limited to, that shown in FIG. 2. The sound effect selection screen includes all sound effects recorded in the sound effect list and a default option. When the user selects a sound effect B, a sound effect plug-in corresponding to the sound effect B is used as the first sound effect plug-in. When the user selects the default option, one of sound effect plug-ins corresponding to a sound effect A, the sound effect B, and a sound effect C is used as the first sound effect plug-in based on the preset rule.

In this embodiment of the present invention, the first sound effect plug-in may further be switched at any time according to an indication from the user and/or a sound effect selection policy of a sound playing application program. In an example, after the system layer of the terminal device determines a sound effect plug-in in the sound effect list as the first sound effect plug-in, the application layer of the terminal device sends a sound effect switching instruction to the system layer of the terminal device, and the system layer of the terminal device determines another sound effect plug-in in the sound effect list as the first sound effect plug-in based on the sound effect switching instruction. Sending of the sound effect switching instruction from the application layer of the terminal device to the system layer of the terminal device may be triggered by an indication from the user, or may be triggered by an application program according to a preset policy. For example, the preset policy is periodically sending the sound effect switching instruction, or the preset policy is sending the sound effect switching instruction based on a label of an audio file. When the audio file is a song, a correspondence between a song label and a sound effect identifier may be shown in Table 2.

TABLE 2

| Song Label | Sound Effect Identifier |
| --- | --- |
| Dance music | Sound effect A |
| Classical music | Sound effect B |

It may be learned from Table 2 that if the song is labeled with dance music, a sound effect switching instruction of switching to a sound effect A may be sent; or if the song is labeled with classical music, a sound effect switching instruction of switching to a sound effect B may be sent.

In an example, after the system layer of the terminal device stores the handle of each of the at least one sound effect plug-in in the sound effect list, when the terminal device is powered off, the system layer of the terminal device releases a resource used by the at least one sound effect plug-in, and deletes the handle that is of each of the at least one sound effect plug-in and that is stored in the sound effect list; and/or when the application layer of the terminal device sends indication information of uninstalling a sound effect plug-in to the system layer of the terminal device, the system layer of the terminal device deletes a handle that is of the uninstalled sound effect plug-in and that is stored in the sound effect list.

In an example, before step 112, the terminal device determines, based on a scenario type of the sound, to perform global sound effect processing on the sound. In this way, global sound effect processing may be performed only on some sounds, to avoid a waste of processing resources of the terminal device resulting from performing global sound effect processing on all sounds. A correspondence between a scenario type of a sound and whether to perform global sound effect processing may be shown in Table 3.

TABLE 3

| Scenario Type of a Sound | Whether to Perform Global Sound Effect Processing (Yes/No) |
| --- | --- |
| Song | Yes |
| Incoming call ringtone | No |
| Message alert tone | No |

In an example, before step 112, the terminal device receives update information of a sound effect processing parameter, and updates the first sound effect plug-in based on the update information of the sound effect processing parameter, so that more flexible and diverse sound effect processing can be provided.

According to the multimedia data playing method provided in this embodiment of the present invention, a sound effect plug-in at the application layer is registered with the system layer, so that fast integrated development of applications of a chip manufacturer and a sound effect developer of a mobile phone terminal can be implemented, and different sound effects experienced by the user can be maximized.

Figure 3:
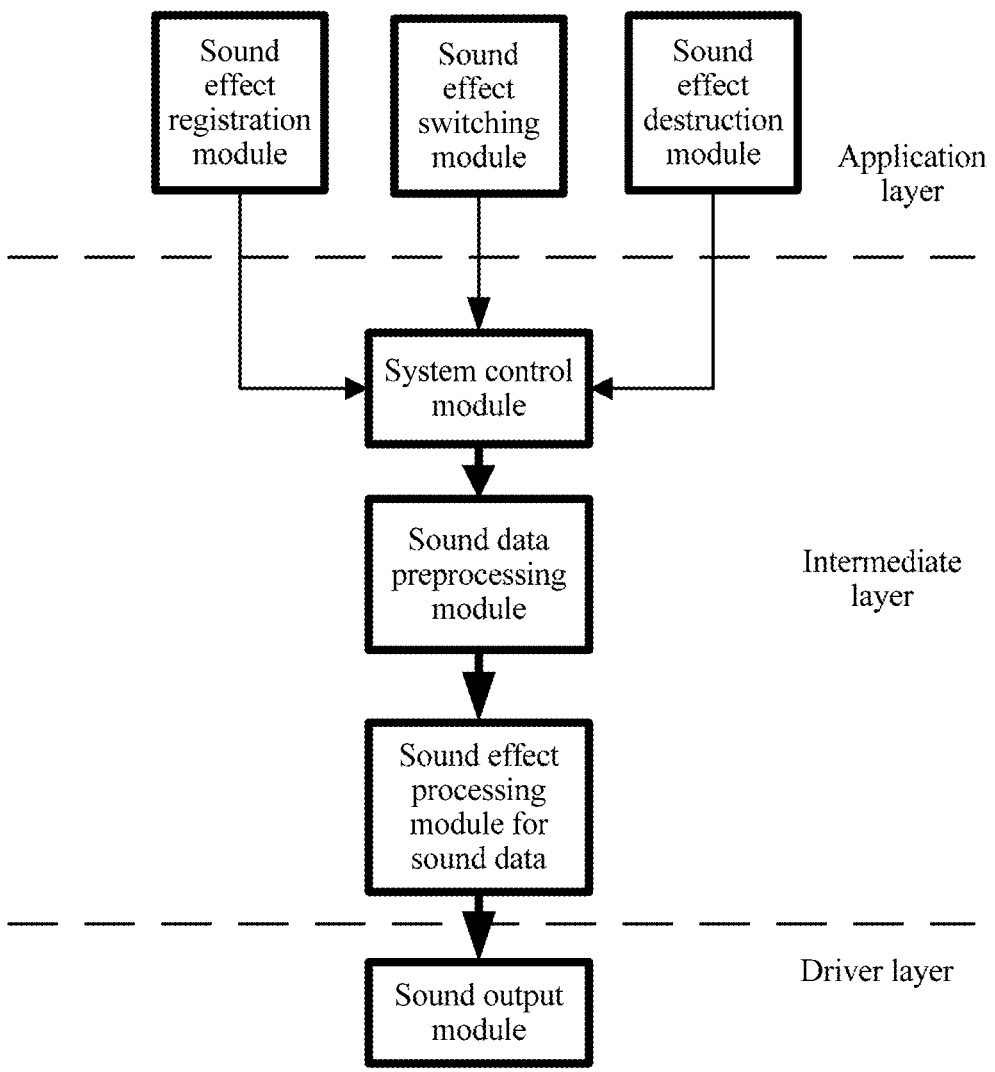
FIG. 3 is a structural diagram of a terminal device according to an embodiment of the present invention.

FIG. 3 is a structural diagram of a terminal device according to an embodiment of the present invention. The terminal device is configured to perform the multimedia data playing methods provided in the embodiments of the present invention, and the terminal device includes the following modules: a sound effect registration module, a sound effect switching module, and a sound effect destruction module that operate at an application layer, a system control module, a sound data preprocessing module, and a sound effect processing module for sound data that operate at an intermediate layer, and a sound output module that operates at a driver layer. The intermediate layer is also referred to as a system layer or an audio system control layer.

Figure 4:
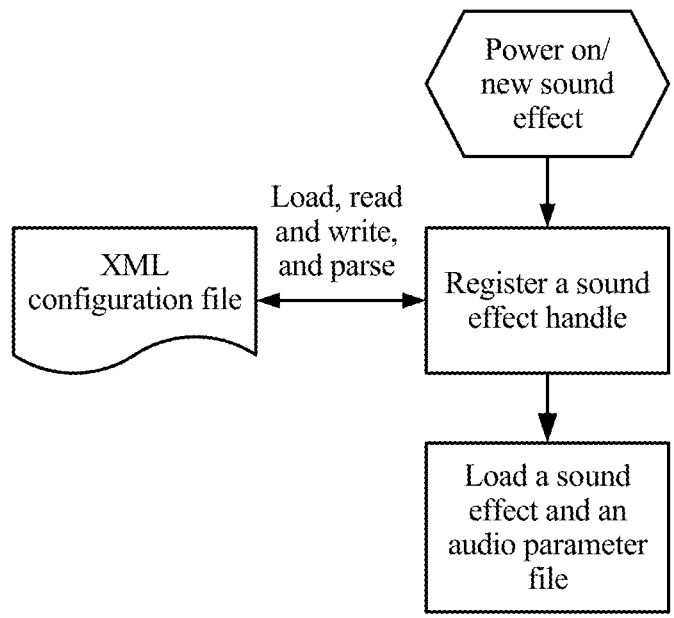
FIG. 4 is a schematic diagram of sound effect registration according to an embodiment of the present invention.

As shown in FIG. 4, FIG. 4 is a schematic diagram of sound effect registration. The sound effect registration module is used by the application layer to register a plurality of existing sound effect plug-ins after the terminal device is powered on. In addition, when a new sound effect plug-in is added, a registration initialization action is also performed on the sound effect. A registered sound effect plug-in has a corresponding handle at the system layer, to facilitate subsequent processing on the sound effect. In this embodiment of the present invention, registration information of a sound effect plug-in may be recorded in an Extensible Markup Language (XML) configuration file, and a handle of the sound effect plug-in may be subsequently obtained by loading, reading and writing, and parsing the XML configuration file. To facilitate subsequent sound effect processing on a sound by using the sound effect plug-in, a sound effect and an audio parameter file may be loaded when a sound effect handle is registered. The audio parameter file includes a sound effect processing parameter of the sound effect plug-in, and a correspondence between sound effect identifiers of a plurality of sound effects and sound effect handles may be stored in the XML configuration file in a form of a sound effect list.

Figure 5:
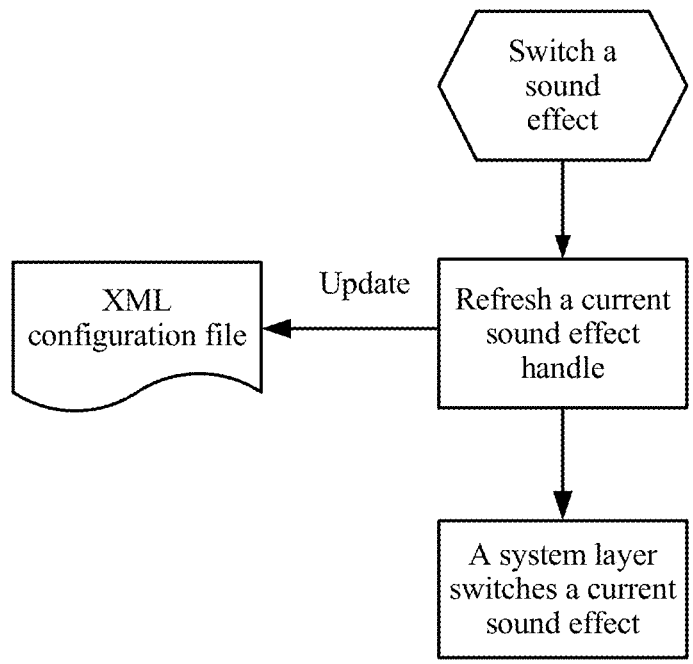
FIG. 5 is a schematic diagram of sound effect switching according to an embodiment of the present invention.

As shown in FIG. 5, FIG. 5 is a schematic diagram of sound effect switching. The sound effect switching module is configured to change, by using an application or a configuration file embedded in the terminal or in another manner, a handle that is of a current sound effect plug-in and that exists in the system layer. The current sound effect plug-in has a same meaning as the foregoing first sound effect plug-in.

Figure 6:
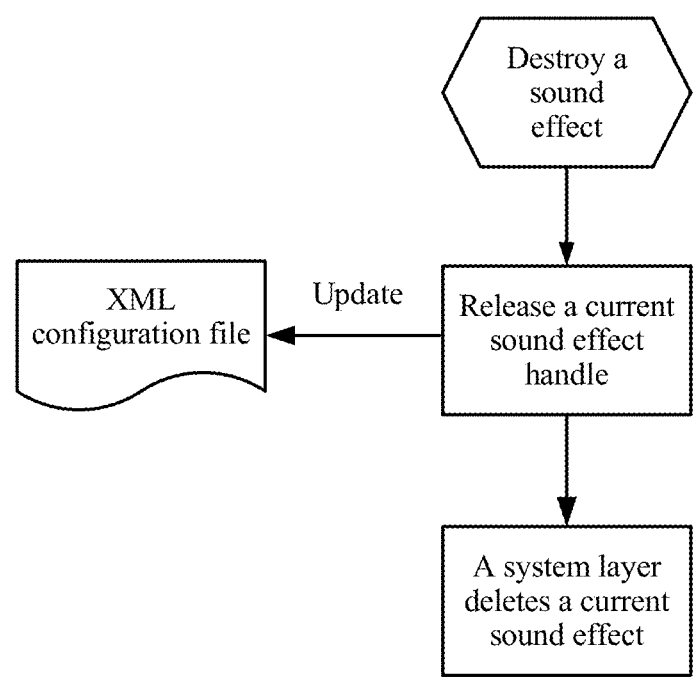
FIG. 6 is a schematic diagram of sound effect destruction according to an embodiment of the present invention.

As shown in FIG. 6, FIG. 6 is a schematic diagram of sound effect destruction. The sound effect destruction module is configured to: when the terminal device is powered off or a specific sound effect plug-in is no longer used, release a related resource occupied by the sound effect plug-in, and instruct the system layer to destroy a handle corresponding to the sound effect. The resource may be, but is not limited to, a resource such as a memory applied for.

Figure 7:
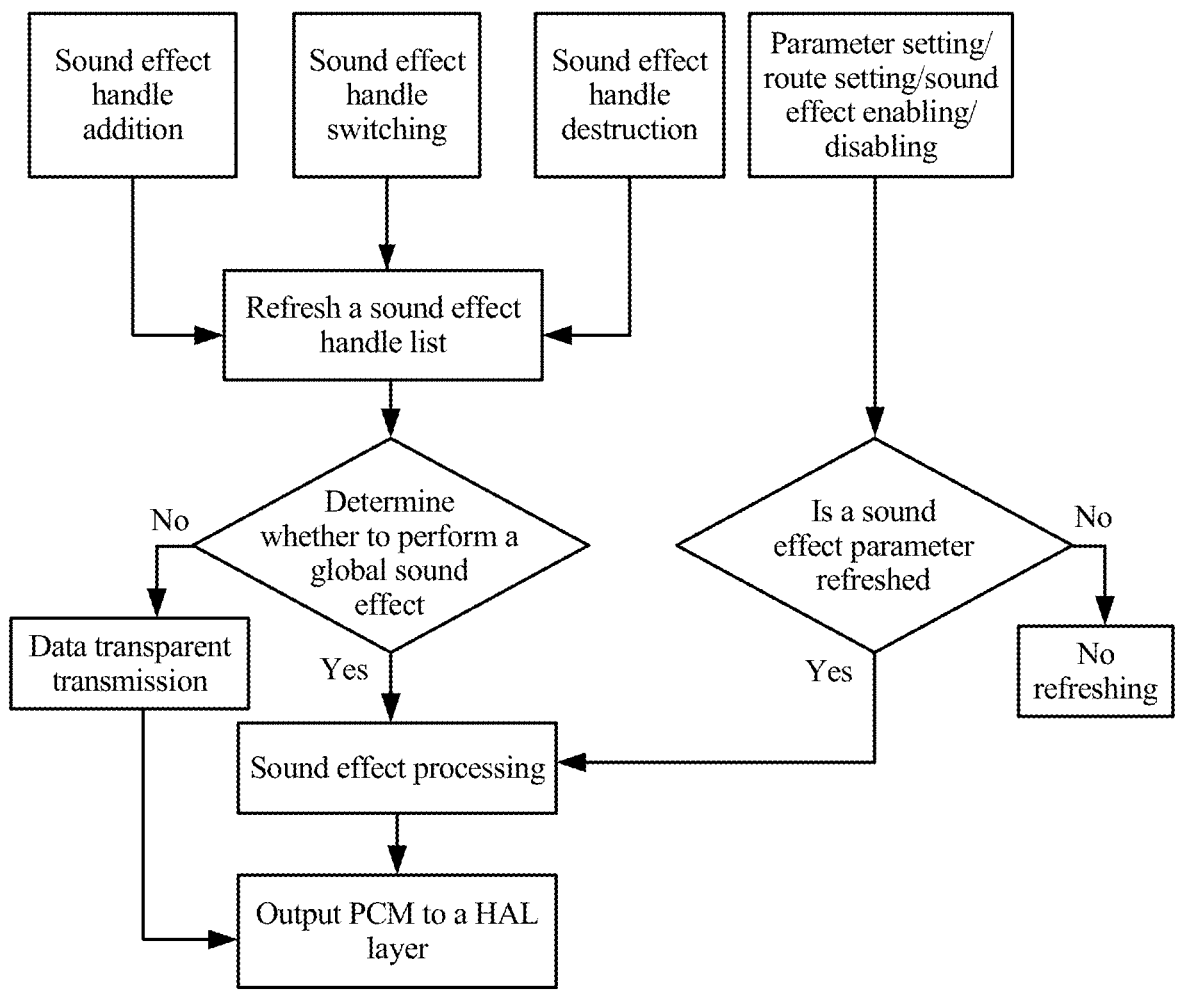
FIG. 7 is a schematic diagram of system control according to an embodiment of the present invention.

As shown in FIG. 7, FIG. 7 is a schematic diagram of system control. The system control module is configured to: manage a handle corresponding to a sound effect plug-in, and use the handle to complete data transmission before and after sound effect processing. Main operations of the system control module are as follows: (1) Maintain a sound effect handle list, and use, by default, a previously used sound effect handle as a currently used sound effect object, where when sound effect addition, switching, or destruction is performed, the handle list is correspondingly adjusted, and when a sound effect plug-in does not exist or a sound effect is destroyed, no sound effect processing is performed. (2) Because the layer is located prior to a sound output layer, perform scenario determining processing for all media sounds output by the terminal device, to achieve a global sound effect for a multimedia scenario. (3) Control the sound effect registration module and the sound effect destruction module to perform corresponding sound effect initialization and resource release procedures; set a routing device that outputs a current sound; enable or disable a sound effect function, and so on.

The sound data preprocessing module is configured to perform matching between a sound and a sampling rate and a quantity of sound channels of the terminal device.

Figure 8:
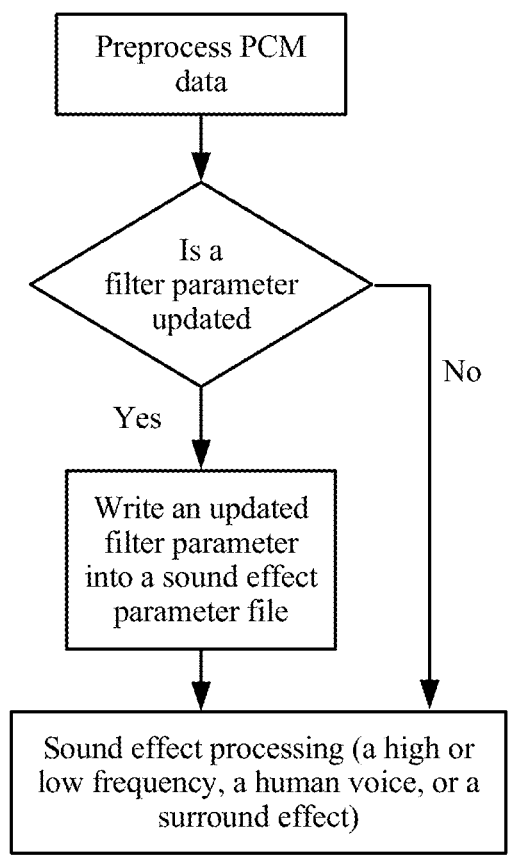
FIG. 8 is a schematic diagram of sound effect processing according to an embodiment of the present invention.

As shown in FIG. 8, FIG. 8 is a schematic diagram of sound effect processing. The sound effect processing module for sound data is configured to use the handle of the current sound effect plug-in to complete data transmission during the sound effect processing. Main operations of the sound effect processing module for sound data are as follows: (1) Use, as an input source by using a handle function that exists at the system layer, pulse code modulation (Pulse Code Modulation, PCM) data that is obtained after sound preprocessing; send, by using a hook (hook) function, sound data to a corresponding sound effect plug-in for processing; and send processed output data to the sound output module to drive sound generation. (2) Support setting of a sound effect processing parameter such as a high frequency, a low frequency, or a surround effect for each processing module in the current sound effect plug-in, where parameter setting is supported, and a specified parameter is written into an audio parameter file, to subsequently take effect continuously; and the audio parameter file is also referred to as a sound effect parameter file.

In this embodiment of the present invention, a hook interface is normalized because there is an internal difference between binary files of sound effect companies. In an example, a parameter setting of effect_proc (const int effect_type, void*pSource, audio_format_t format, void*pSamples, int sampleBytes, int sampleRate, int countChans) may be used to shield an internal binary difference, where effect_type corresponds to a sound effect type, pSource represents PCM data to be processed, and other parameters are a sampling rate, a quantity of channels, and a quantity of bytes that are required for a sound effect. In other words, prepared PCM data is sent to the sound effect processing module for sound processing, and returned memory data is PCM data that has been processed, to implement sound effect processing.

Figure 9:
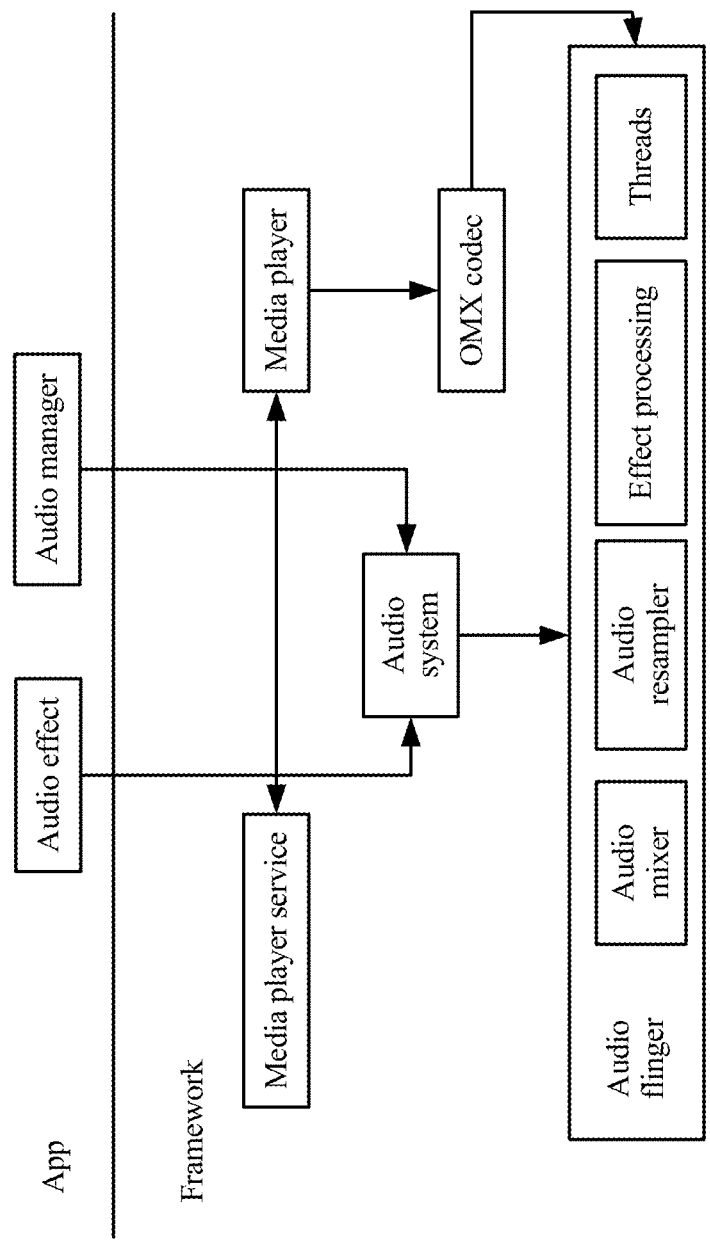
FIG. 9 is a schematic diagram of a system architecture applied to an embodiment of the present invention.

FIG. 9 is a schematic diagram of a system architecture applied to an embodiment of the present invention. An Android (Android) platform architecture is used as an example for description. An APP in Android is equivalent to an application layer in a module design, and mainly uses classes relating to audio manager and audio effect, which implement sound effect registration, switching, and deregistration operations by using the APP. Audio flinger and threads at a framework layer of Android implement operations of an audio system control layer, to manage and control a sound effect plug-in by using a list, and perform preprocessing determining, that is, scenario determining, on sound effect data by using a playback thread class, for subsequent sound effect processing and a global sound effect. Effect processing at the framework layer of Android implements sound effect processing for PCM data. In addition, when a sound effect parameter that is set at the application layer is changed, automatic adaptation takes effect based on a current sound effect.

Figure 10:
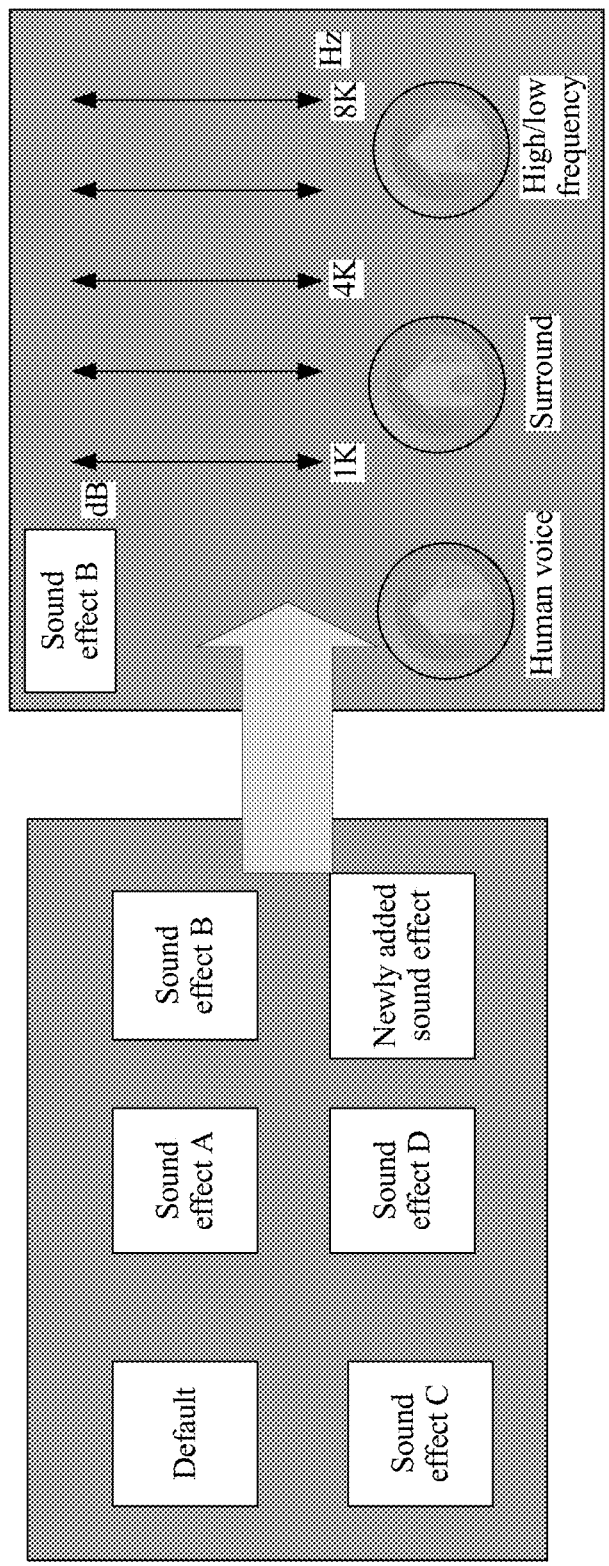
FIG. 10 is a schematic diagram of a specific application scenario of a multimedia data playing method according to an embodiment of the present invention.

FIG. 10 is a schematic diagram of a specific application scenario of a multimedia data playing method according to an embodiment of the present invention. Referring to FIG. 10, after a terminal device is powered on, a sound effect registration module at an application layer operates and registers a sound effect A, a sound effect B, a sound effect C, and a sound effect D with a system layer, and registers a newly added sound effect with the system layer in subsequent use of the terminal device. A user listens to music by using a music player, and a sound effect selection screen is displayed on a display screen of the terminal device. The user selects the sound effect A. In this case, a sound effect switching module sets the sound effect A at the system layer as a current sound effect. A system control module operates. The system layer performs sound effect processing on decoded and resampled data by using the sound effect A, and outputs processed data, so that the user feels the sound effect A. When a sound effect processing module for sound data operates, the user may change an effect such as a high or low frequency or a surround effect based on the sound effect A, may switch the current sound effect, and may enable the newly added sound effect based on a specified parameter. The user inserts a headset, and a current sound effect handle is routed based on a current sound device, so that a corresponding audio parameter is updated, and an updated sound effect is enabled. When a sound effect destruction module at the application layer operates, after the user turns off the terminal device or deletes the sound effect A, the sound effect destruction module destroys the sound effect A, and removes a corresponding handle at the system layer, to release a related resource. When the sound effect switching module at the application layer operates, for example, if the user first selects the sound effect A but then selects the sound effect B, the sound effect switching module switches the current sound effect to the sound effect B, and another process is similar to that of the sound effect A.

In this embodiment of the present invention, sound effect registration, switching, and sound processing are implemented by using a plug-in, to shield an internal binary implementation difference between sound effects, so that a global sound effect takes effect. The user can freely switch a sound effect type in one application to enjoy a global sound effect. Sound effect parameter format normalization is supported, and a sound effect processing difference is completed inside the plug-in. A sound effect plug-in takes effect as a global sound effect. A sound effect is customized based on a user preference or a requirement of a mobile phone manufacturer. This shortens development and integration periods, and enhances expansibility. The sound effect is not limited to a single application, and is applicable to a multimedia scenario.

The current design mainly considers a sound effect of a sound to be played. Currently, there is no professional sound effect for processing in a recording scenario. A recording sound effect may be performed in a similar manner. The sound effect may be placed at a hardware abstraction layer (HAL) or in a PCM reading procedure after a HAL, complete recording data is transmitted to the system layer, and then the sound effect is added to the data. For example, a new sound effect E is added. The sound effect E may be placed at the HAL layer. After data reading, data read from a bottom layer is sent to the sound effect E by using a function similar to a hook function in a playing procedure, and is processed within the sound effect E. Processed data is sent to an upper-layer application. To be specific, a global sound effect is added on a recording channel during recording.

Figure 11:
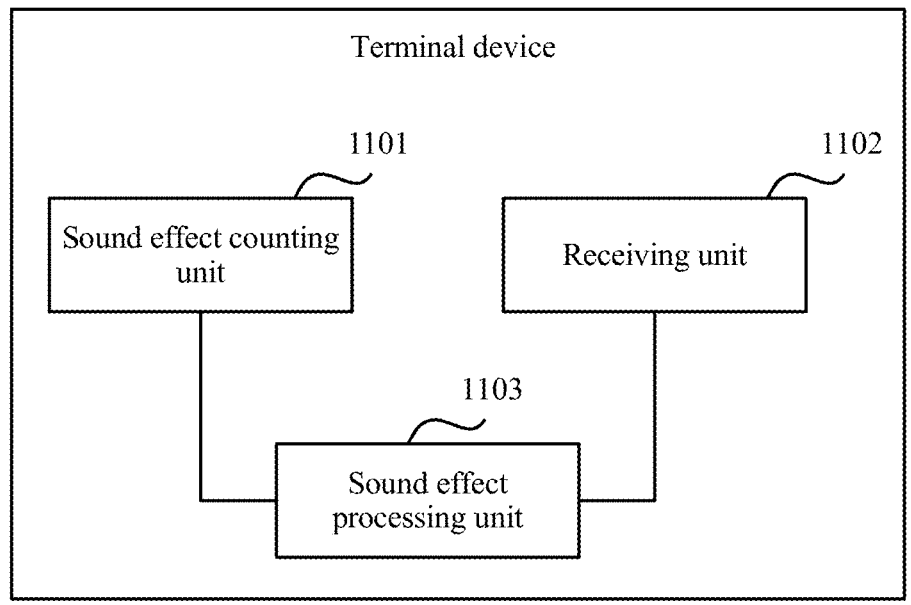
FIG. 11 is a structural diagram of another terminal device according to an embodiment of the present invention.

FIG. 11 is a structural diagram of another terminal device according to an embodiment of the present invention. The terminal device includes: a sound effect counting unit 1101, a receiving unit 1102, and a sound effect processing unit 1103.

The sound effect counting unit 1101 is configured to create a sound effect list, where the sound effect list stores access information of each of at least one sound effect plug-in that exists in the terminal device.

The sound effect processing unit 1103 is configured to: when the receiving unit 1102 receives indication information of playing a sound, obtain access information of a first sound effect plug-in from the sound effect list created by the sound effect counting unit 301, and transmit audio data of the sound to the first sound effect plug-in based on the access information of the first sound effect plug-in, so that the first sound effect plug-in performs sound effect processing on the audio data of the sound.

In an example, the sound effect counting unit 1101 includes:

a registration subunit, configured to: when the terminal device is powered on, register the existing at least one sound effect plug-in with a system layer of the terminal device by using an application layer of the terminal device; and a storage subunit, configured to store a handle of each of the at least one sound effect plug-in in the sound effect list by using the system layer of the terminal device.

The sound effect processing unit 1103 includes:

a transmission subunit, configured to: when the receiving unit 1102 receives the indication information of playing a sound, transmit the audio data of the sound to the system layer of the terminal device by using the application layer of the terminal device; and a processing subunit, configured to: obtain a handle of the first sound effect plug-in from the sound effect list by using the system layer of the terminal device, and transmit the audio data of the sound to the first sound effect plug-in based on the handle of the first sound effect plug-in, so that the first sound effect plug-in performs sound effect processing on the audio data of the sound.

In an example, the registration subunit is further configured to: after the storage subunit stores the handle of each of the at least one sound effect plug-in in the sound effect list by using the system layer of the terminal device, when a new sound effect plug-in is added to the application layer of the terminal device, register the newly added sound effect plug-in with the system layer of the terminal device by using the application layer of the terminal device.

The storage subunit is further configured to store a handle of the newly added sound effect plug-in in the sound effect list by using the system layer of the terminal device.

In an example, the terminal device further includes a sound effect determining unit, configured to: determine a sound effect plug-in in the sound effect list as the first sound effect plug-in by using the system layer of the terminal device, before the system layer of the terminal device obtains the handle of the first sound effect plug-in from the sound effect list, and transmits the audio data of the sound to the first sound effect plug-in based on the handle of the first sound effect plug-in, so that the first sound effect plug-in performs sound effect processing on the audio data of the sound.

In an example, the terminal device further includes: a sending unit, configured to: after the system layer of the terminal device determines the sound effect plug-in in the sound effect list as the first sound effect plug-in, send a sound effect switching instruction to the system layer of the terminal device by using the application layer of the terminal device; and a switching unit, configured to determine another sound effect plug-in in the sound effect list as the first sound effect plug-in based on the sound effect switching instruction by using the system layer of the terminal device.

In an example, the terminal device further includes: a destruction unit, configured to: after the system layer of the terminal device stores the handle of each of the at least one sound effect plug-in in the sound effect list, when the terminal device is powered off, release, by using the system layer of the terminal device, a resource used by the at least one sound effect plug-in, and delete the handle that is of each of the at least one sound effect plug-in and that is stored in the sound effect list; and/or when the application layer of the terminal device sends indication information of uninstalling a sound effect plug-in to the system layer of the terminal device, delete, by using the system layer of the terminal device, a handle that is of the uninstalled sound effect plug-in and that is stored in the sound effect list.

In an example, the terminal device further includes a scenario determining unit, configured to: determine, based on a scenario type of the sound, to perform global sound effect processing on the sound, before the sound effect processing unit 1103 obtains, when the receiving unit 1102 receives the indication information of playing a sound, the access information of the first sound effect plug-in from the sound effect list, and transmits the audio data of the sound to the first sound effect plug-in based on the access information of the first sound effect plug-in, so that the first sound effect plug-in performs sound effect processing on the audio data of the sound.

In an example, the receiving unit 1102 is further configured to: receive update information of a sound effect processing parameter, before the sound effect processing unit 1103 obtains, when the indication information of playing a sound is received, the access information of the first sound effect plug-in from the sound effect list, and transmits the audio data of the sound to the first sound effect plug-in based on the access information of the first sound effect plug-in, so that the first sound effect plug-in performs sound effect processing on the audio data of the sound.

The terminal device further includes an update unit, configured to update the first sound effect plug-in based on the update information of the sound effect processing parameter.

Figure 12:
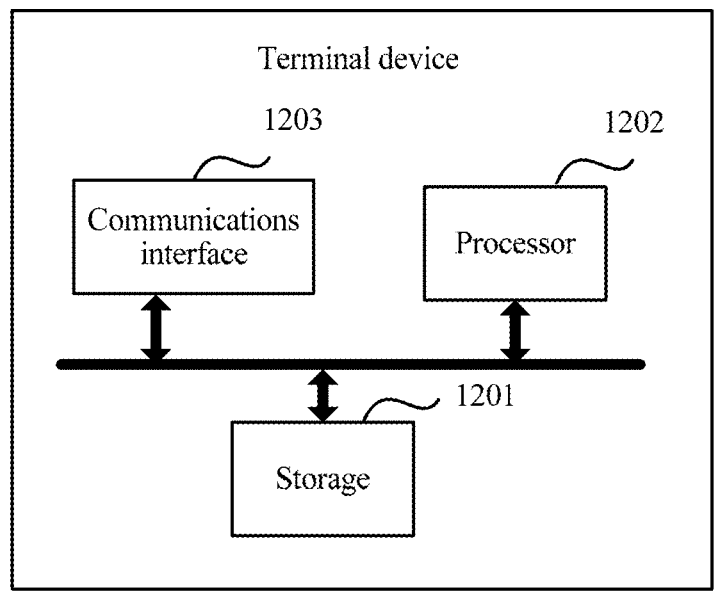
FIG. 12 is a structural diagram of still another terminal device according to an embodiment of the present invention.

FIG. 12 is a structural diagram of still another terminal device according to an embodiment of the present invention. The terminal device is configured to perform the multimedia data playing methods provided in the embodiments of the present invention. The terminal device includes: a storage 1201, a processor 1202, and a communications interface 1203.

The storage 1201 is configured to store a program instruction.

The processor 1202 is configured to perform, based on the program instruction stored in the storage 1201, the following operations: creating a sound effect list, where the sound effect list stores access information of each of at least one sound effect plug-in that exists in the terminal device; and obtaining, when receiving, by using the communications interface 1203, indication information of playing a sound, access information of a first sound effect plug-in from the sound effect list, and transmitting audio data of the sound to the first sound effect plug-in based on the access information of the first sound effect plug-in, so that the first sound effect plug-in performs sound effect processing on the audio data of the sound.

In an example, that the processor 1202 performs the operation of creating a sound effect list by the terminal device includes: when the terminal device is powered on, an application layer of the terminal device registers the existing at least one sound effect plug-in with a system layer of the terminal device; and the system layer of the terminal device stores a handle of each of the at least one sound effect plug-in in the sound effect list. That the processor 1202 performs the operation of obtaining, when receiving, by using the communications interface 1203, indication information of playing a sound, access information of a first sound effect plug-in from the sound effect list, and transmitting audio data of the sound to the first sound effect plug-in based on the access information of the first sound effect plug-in, so that the first sound effect plug-in performs sound effect processing on the audio data of the sound includes: when the indication information of playing a sound is received by using the communications interface, the application layer of the terminal device transmits the audio data of the sound to the system layer of the terminal device; and the system layer of the terminal device obtains a handle of the first sound effect plug-in from the sound effect list, and transmits the audio data of the sound to the first sound effect plug-in based on the handle of the first sound effect plug-in, so that the first sound effect plug-in performs sound effect processing on the audio data of the sound.

In an example, the processor 1202 is further configured to perform, based on the program instruction stored in the storage 1201, the following operations: after the system layer of the terminal device stores the handle of each of the at least one sound effect plug-in in the sound effect list, when a new sound effect plug-in is added to the application layer of the terminal device, registering the newly added sound effect plug-in with the system layer of the terminal device by using the application layer of the terminal device, and storing a handle of the newly added sound effect plug-in in the sound effect list by using the system layer of the terminal device.

In an example, the processor 1202 is further configured to perform, based on the program instruction stored in the storage 1201, the following operation: determining a sound effect plug-in in the sound effect list as the first sound effect plug-in by using the system layer of the terminal device, before the system layer of the terminal device obtains the handle of the first sound effect plug-in from the sound effect list, and transmits the audio data of the sound to the first sound effect plug-in based on the handle of the first sound effect plug-in, so that the first sound effect plug-in performs sound effect processing on the audio data of the sound.

In an example, the processor 1202 is further configured to perform, based on the program instruction stored in the storage 1201, the following operations: after the system layer of the terminal device determines the sound effect plug-in in the sound effect list as the first sound effect plug-in, sending a sound effect switching instruction to the system layer of the terminal device by using the application layer of the terminal device; and determining another sound effect plug-in in the sound effect list as the first sound effect plug-in based on the sound effect switching instruction by using the system layer of the terminal device.

In an example, the processor 1202 is further configured to perform, based on the program instruction stored in the storage 1201, the following operations: after the system layer of the terminal device stores the handle of each of the at least one sound effect plug-in in the sound effect list, when the terminal device is powered off, releasing, by using the system layer of the terminal device, a resource used by the at least one sound effect plug-in, and deleting the handle that is of each of the at least one sound effect plug-in and that is stored in the sound effect list; and/or when the application layer of the terminal device sends indication information of uninstalling a sound effect plug-in to the system layer of the terminal device, deleting, by using the system layer of the terminal device, a handle that is of the uninstalled sound effect plug-in and that is stored in the sound effect list.

In an example, the processor 1202 is further configured to perform, based on the program instruction stored in the storage 1201, the following operation: determining, based on a scenario type of the sound, to perform global sound effect processing on the sound, before the processor 1202 obtains, when the indication information of playing a sound is received by using the communications interface 1203, the access information of the first sound effect plug-in from the sound effect list, and transmits the audio data of the sound to the first sound effect plug-in based on the access information of the first sound effect plug-in, so that the first sound effect plug-in performs sound effect processing on the audio data of the sound.

In an example, the processor 1202 is further configured to perform, based on the program instruction stored in the storage 1201, the following operations: receiving update information of a sound effect processing parameter by using the communications interface 1203, before the processor 1202 obtains, when the indication information of playing a sound is received by using the communications interface 1203, the access information of the first sound effect plug-in from the sound effect list, and transmits the audio data of the sound to the first sound effect plug-in based on the access information of the first sound effect plug-in, so that the first sound effect plug-in performs sound effect processing on the audio data of the sound; and updating the first sound effect plug-in based on the update information of the sound effect processing parameter.

Figure 13:
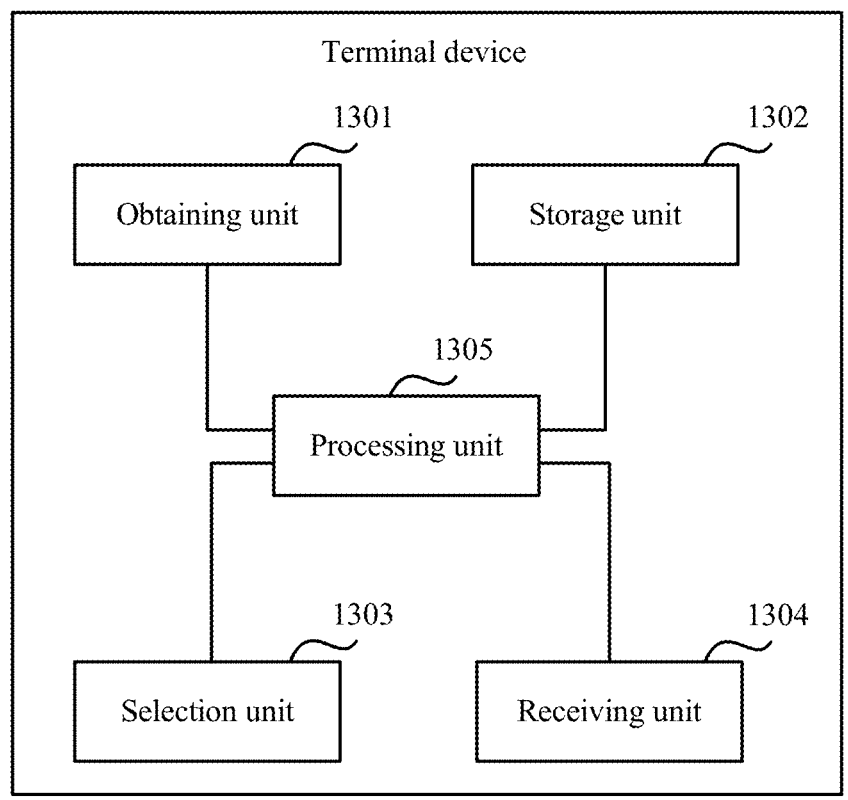
FIG. 13 is a structural diagram of yet another terminal device according to an embodiment of the present invention.

FIG. 13 is a structural diagram of yet another terminal device according to an embodiment of the present invention. The terminal device is configured to perform the multimedia data playing methods provided in the embodiments of the present invention. The terminal device includes: an obtaining unit 1301, a storage unit 1302, a selection unit 1303, a receiving unit 1304, and a processing unit 1305.

The obtaining unit 1301 is configured to obtain a first sound effect plug-in, where the first sound effect plug-in corresponds to a first sound effect.

The storage unit 1302 is configured to store a first application and a second application that are used to play multimedia data.

The selection unit 1303 is configured to provide a first sound effect option corresponding to the first sound effect, for selection by a user.

The receiving unit 1304 is configured to receive a first instruction used to indicate that the user selects the first sound effect option provided by the selection unit 1303.

The processing unit 1305 is configured to: when first multimedia data is to be played by the first application stored in the storage unit 1302, process, according to the first instruction received by the receiving unit 1304, the first multimedia data by using the first sound effect plug-in obtained by the obtaining unit 1301, to play the first multimedia data with the first sound effect.

The processing unit 1305 is further configured to: when second multimedia data is to be played by the second application stored in the storage unit 1302, process, according to the first instruction received by the receiving unit 1304, the second multimedia data by using the first sound effect plug-in obtained by the obtaining unit 1301, to play the second multimedia data with the first sound effect.

In an example, the obtaining unit 1301 is specifically configured to: obtain the first sound effect plug-in from outside of the terminal device; or obtain the first sound effect plug-in from a third application.

In an example, the receiving unit 1304 is further configured to: when the processing unit 1305 processes the first multimedia data or the second multimedia data by using the first sound effect plug-in, receive a sound effect switching instruction used to select a second sound effect;

the storage unit 1302 is further configured to store a second sound effect plug-in corresponding to the second sound effect; and the processing unit 1305 is further configured to process, according to the sound effect switching instruction received by the receiving unit 1304, the first multimedia data or the second multimedia data by using the second sound effect plug-in stored in the storage unit 1302, to play the first multimedia data or the second multimedia data with the second sound effect.

In an example, the receiving unit 1304 is further configured to receive a parameter setting instruction from the user, where the parameter setting instruction is used to set a sound effect parameter value; and the processing unit 1305 is further configured to update a sound effect parameter value in the first sound effect plug-in according to the parameter setting instruction received by the receiving unit 1304.

In an example, the terminal device further includes a detection unit, configured to detect that a current routing mode is a speaker mode or a headset mode; and the processing unit 1305 is further configured to adjust the sound effect parameter value in the first sound effect plug-in based on the routing mode detected by the detection unit.

In an example, the receiving unit 1304 is further configured to receive a sound effect enabling/disabling instruction from the user; and the processing unit 1305 is further configured to enable or disable the first sound effect plug-in according to the sound effect enabling/disabling instruction received by the receiving unit 1304.

In an example, the processing unit 1305 is further configured to play multimedia data by using a default sound effect after disabling the first sound effect plug-in.

In an example, the receiving unit 1304 is further configured to: when the processing unit 1305 processes the first multimedia data or the second multimedia data by using the first sound effect plug-in, receive a sound effect destruction instruction from the user;

the processing unit 1305 is further configured to delete the first sound effect plug-in according to the sound effect destruction instruction received by the receiving unit 1304; and the processing unit 1305 is further configured to process the first multimedia data or the second multimedia data by using a third sound effect plug-in.

In an example, the receiving unit 1304 is further configured to: when the processing unit 1305 processes the first multimedia data or the second multimedia data by using the first sound effect plug-in, receive a sound effect destruction instruction from the user;

the processing unit 1305 is further configured to confirm that audio data playing on the first application ends; and the processing unit 1305 is further configured to delete the first sound effect plug-in according to the sound effect destruction instruction.

The obtaining unit 1301 may be specifically a processor, and the processor may obtain the sound effect plug-in from the outside of the terminal device by using a radio frequency circuit, or may directly obtain the sound effect plug-in from an application included in the terminal device. The selection unit 1303 may be specifically a display, the receiving unit 1304 may be specifically an input device, the storage unit 1302 may be specifically a storage, and the processing unit 1305 may be specifically a processor.

Figure 14:
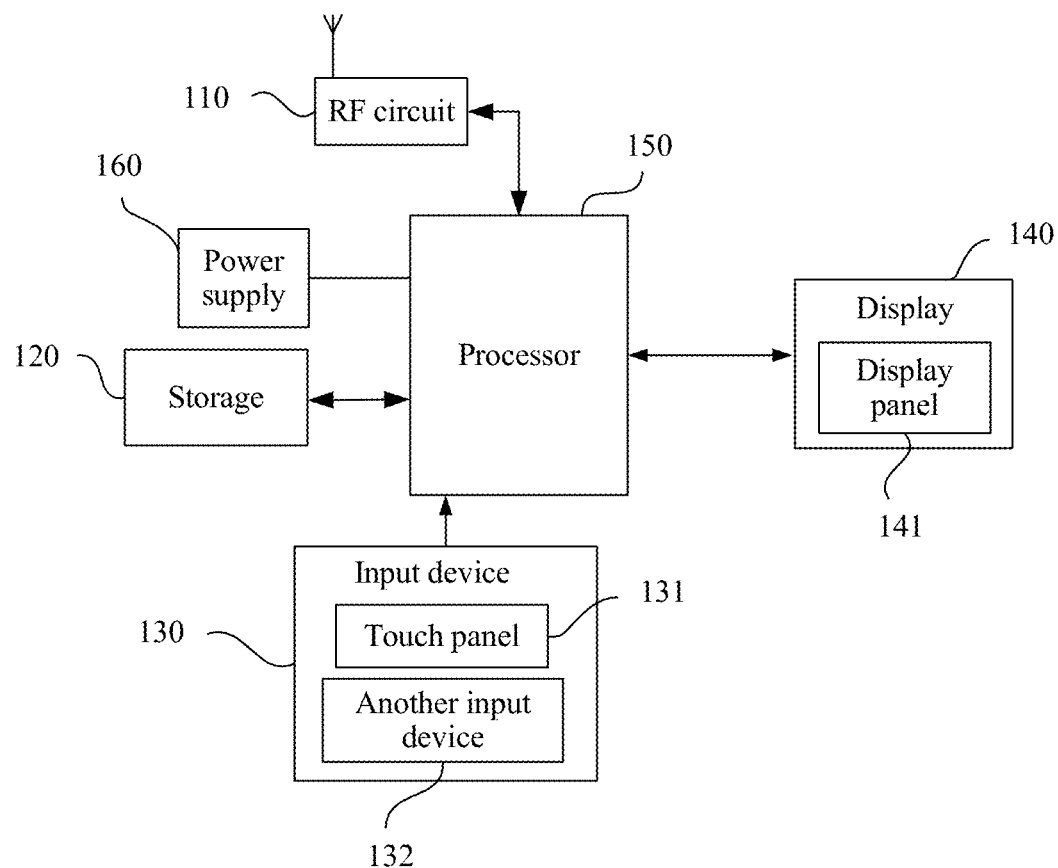
FIG. 14 is a structural diagram of a still yet another terminal device according to an embodiment of the present invention.

Referring to FIG. 14, an embodiment of the present invention provides a terminal device, including components such as a radio frequency (English: Radio Frequency, RF) circuit 110, a storage 120, an input unit 130, a display 140, a processor 150, and a power supply 160. A person skilled in the art may understand that a structure of the terminal shown in FIG. 14 does not constitute a limitation on the terminal device, and the terminal device may include more or fewer components than those shown in the figure, or combine some components, or have different component arrangements.

Each constituent component of the terminal device is specifically described below with reference to FIG. 14.

The RF circuit 110 may be configured to: receive and send information, for example, exchange information with a device such as a server, and send the received information to the processor 150 for processing. Generally, the RF circuit 110 includes, but is not limited to: an antenna, at least one amplifier, a transceiver, a coupler, a low noise amplifier (English: Low Noise Amplifier, LNA), a duplexer, and the like. In addition, the RF circuit 110 may communicate with a network and another device through wireless communication. The wireless communication may use any communications standard or protocol that includes, but is not limited to: the Global System for Mobile Communications (English: Global System for Mobile Communications, GSM), a general packet radio service (English: General Packet Radio Service, GPRS), Code Division Multiple Access (English: Code Division Multiple Access, CDMA), Wideband Code Division Multiple Access (English: Wideband Code Division Multiple Access, WCDMA), Long Term Evolution (English: Long Term Evolution, LTE), an email, a short message service (English: Short Message Service, SMS), and the like.

The storage 120 may be configured to store a software program and a module. The processor 150 runs the software program and the module that are stored in the storage 120, so that the terminal device performs the foregoing multimedia data playing methods. The storage 120 may mainly include a program storage area and a data storage area. The program storage area may store an operating system, an application program required for implementing the foregoing multimedia data playing methods, and the like. The data storage area may store a handle of a sound effect plug-in and the like. In addition, the storage 120 may be a volatile memory (English: volatile memory), for example, a random access memory (English: random access memory, RAM for short). The storage 120 may alternatively be a non-volatile memory (English: non-volatile memory), for example, a read-only memory (English: read-only memory, ROM for short), a flash memory (English: flash memory), a hard disk (English: hard disk drive, HDD for short), or a solid state drive (English: solid state drive, SSD for short). The storage 120 may further include a combination of the foregoing types of memories.

The input device 130 may be configured to receive an instruction entered by a user. Specifically, the input device 130 may include a touch panel 131 and another input device 132. The touch panel 131, also referred to as a touchscreen, can collect a touch operation (for example, an operation performed by the user on or near the touch panel 131 by using any appropriate object or accessory such as a finger or a stylus) of the user on or near the touch panel 131, and drive a corresponding connection apparatus based on a preset program. Optionally, the touch panel 131 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, then sends the touch point coordinates to the processor 150, and can receive and perform a command sent by the processor 150. In addition, the input device 130 may implement the touch panel 131 in a plurality of types, such as a resistive type, a capacitive type, an infrared ray, and a surface acoustic wave. The input apparatus 130 may include the another input device 132 in addition to the touch panel 131. Specifically, the another input device 132 may include but is not limited to one or more of a physical keyboard, a function key (for example, a volume control key or an on/off key), a trackball, a mouse, and a joystick.

The display 140 may be configured to display information about the sound effect plug-in, information provided for the user, or the like. The display 140 may include a display panel 141. Optionally, the display panel 141 may be configured in a form of a liquid crystal display (English: Liquid Crystal Display, LCD), an organic light-emitting diode (English: Organic Light-Emitting Diode, OLED), or the like. Further, the touch panel 131 may cover the display panel 141. When detecting a touch operation on or near the touch panel 131, the touch panel 131 transfers the touch operation to the processor 150 to determine a type of a touch event, and then the processor 150 provides a corresponding visual output on the display panel 141 based on the type of the touch event. Although the touch panel 131 and the display panel 141 in FIG. 14 are used as two independent components to implement input and output functions of the terminal, in some embodiments, the touch panel 131 and the display panel 141 may be integrated to implement the input and output functions of the terminal device.

The processor 150 is a control center of the terminal device, is connected to each part of the entire terminal device by using various interfaces and lines, and performs the multimedia data playing methods by running or executing the software program and/or the module stored in the storage 120, and invoking data stored in the storage 120. Optionally, the processor 150 may include one or more processing units. Preferably, an application processor and a modem processor may be integrated into the processor 150. The application processor mainly processes an operating system, a user interface, an application program, and the like. The modem processor mainly processes wireless communication. It may be understood that the foregoing modem processor may not be integrated into the processor 150.

The terminal device further includes the power supply 160 (for example, a battery) that supplies power to each part. In an example, the power supply may be logically connected to the processor 150 by using a power management system, so that functions such as charging and discharging management and power consumption management are implemented by using the power management system.

Although not shown in the figure, the terminal device may further include a camera, a Bluetooth module, a sensor, an audio frequency circuit, a USB module, and the like, and details are not described herein.

In an example, the processor 150 is configured to perform, based on a program instruction stored in the storage 120, the following operations:

obtaining a first sound effect plug-in, where the first sound effect plug-in corresponds to a first sound effect; storing, by using the storage 120, a first application and a second application that are used to play multimedia data;

providing, by using the display 140, a first sound effect option corresponding to the first sound effect, for selection by the user;

receiving, by the input device 130, a first instruction used to indicate that the user selects the first sound effect option;

when first multimedia data is to be played by the first application, processing the first multimedia data by using the first sound effect plug-in according to the first instruction, to play the first multimedia data with the first sound effect; and when second multimedia data is to be played by the second application, processing the second multimedia data by using the first sound effect plug-in according to the first instruction, to play the second multimedia data with the first sound effect.

In an example, the processor 150 is specifically configured to perform, based on the program instruction stored in the storage 120, the following operation: obtaining the first sound effect plug-in from outside by using the RF circuit 110; or obtaining the first sound effect plug-in from a third application.

In an example, the processor 150 is further configured to perform, based on the program instruction stored in the storage 120, the following operations: when processing the first multimedia data or the second multimedia data by using the first sound effect plug-in, receiving, by using the input device 130, a sound effect switching instruction used to select a second sound effect, where the storage 120 stores a second sound effect plug-in corresponding to the second sound effect; and processing the first multimedia data or the second multimedia data by using the second sound effect plug-in according to the sound effect switching instruction, to play the first multimedia data or the second multimedia data with the second sound effect.

In an example, the processor 150 is further configured to perform, based on the program instruction stored in the storage 120, the following operations: receiving a parameter setting instruction from the user by using the input device 130, where the parameter setting instruction is used to set a sound effect parameter value; and updating a sound effect parameter value in the first sound effect plug-in according to the parameter setting instruction.

In an example, the processor 150 is further configured to perform, based on the program instruction stored in the storage 120, the following operations: detecting that a current routing mode is a speaker mode or a headset mode; and adjusting the sound effect parameter value in the first sound effect plug-in based on the routing mode.

In an example, the processor 150 is further configured to perform, based on the program instruction stored in the storage 120, the following operations: receiving a sound effect enabling/disabling instruction from the user by using the input device 130; and enabling or disabling the first sound effect plug-in according to the sound effect enabling/disabling instruction.

In an example, after performing the operation of disabling the first sound effect plug-in, the processor 150 is further configured to perform, based on the program instruction stored in the storage 120, the following operation: playing multimedia data by using a default sound effect.

In an example, the processor 150 is further configured to perform, based on the program instruction stored in the storage 120, the following operations: when processing the first multimedia data or the second multimedia data by using the first sound effect plug-in, receiving a sound effect destruction instruction from the user by using the input device 130; deleting the first sound effect plug-in according to the sound effect destruction instruction; and processing the first multimedia data or the second multimedia data by using a third sound effect plug-in.

In an example, the processor 150 is further configured to perform, based on the program instruction stored in the storage 120, the following operations: when processing the first multimedia data or the second multimedia data by using the first sound effect plug-in, receiving a sound effect destruction instruction from the user by using the input device 130; confirming that audio data playing on the first application ends; and deleting the first sound effect plug-in according to the sound effect destruction instruction.

Method or algorithm steps described in combination with the content disclosed in the present invention may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to the processor, so that the processor can read information from the storage medium and write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made within the spirit and principle of the present invention shall fall within the protection scope of the present invention.

What is claimed is:

1. A multimedia data playing method, comprising:
   receiving, by a terminal device, a first instruction indicating that a user of the terminal device selects a first sound effect option, wherein the first sound effect option is an option corresponding to a first sound effect plug-in, wherein the first sound effect plug-in includes a sound effect parameter, wherein the first sound effect plug-in corresponds to a first sound effect, wherein the terminal device comprises a first application and a second application that are used to play multimedia data, and wherein the first sound effect is a sound effect added to a third application different from the first application or the second application;
   in response to receiving the first instruction, enabling, by the terminal device, the first sound effect in different applications, wherein the different applications include the first application and the second application;
   after receiving the first instruction, receiving, by the terminal device, a parameter setting instruction, wherein the parameter setting instruction is used to set a value of the sound effect parameter, and wherein the value of the sound effect parameter indicates a surround effect of the first sound effect plug-in;
   updating, by the terminal device, the value of the sound effect parameter in the first sound effect plug-in according to the parameter setting instruction;
   when first multimedia data is to be played by the first application, processing, by the terminal device, the first multimedia data by using the first sound effect plug-in; and
   when second multimedia data is to be played by the second application, processing, by the terminal device, the second multimedia data by using the first sound effect plug-in.

2. The method according to claim 1, wherein the method further comprises:
   when processing the first multimedia data or the second multimedia data by using the first sound effect plug-in, receiving, by the terminal device, a sound effect switching instruction used to select a second sound effect, wherein the terminal device comprises a second sound effect plug-in corresponding to the second sound effect; and
   processing, by the terminal device, the first multimedia data or the second multimedia data by using the second sound effect plug-in according to the sound effect switching instruction to play the first multimedia data or the second multimedia data with the second sound effect.

3. The method according to claim 1, wherein the method further comprises:
   receiving, by the terminal device, a sound effect enabling/disabling instruction from the user; and
   enabling or disabling, by the terminal device, the first sound effect plug-in according to the sound effect enabling/disabling instruction.

4. The method according to claim 3, wherein after the disabling the first sound effect plug-in, the method further comprises:
   playing, by the terminal device, multimedia data by using a default sound effect.

5. The method according to claim 1, wherein the method further comprises:
   when processing the first multimedia data or the second multimedia data by using the first sound effect plug-in, receiving, by the terminal device, a sound effect destruction instruction from the user;
   deleting, by the terminal device, the first sound effect plug-in according to the sound effect destruction instruction; and
   processing, by the terminal device, the first multimedia data or the second multimedia data by using a third sound effect plug-in.

6. The method according to claim 1, wherein the method further comprises:
   when processing the first multimedia data or the second multimedia data by using the first sound effect plug-in, receiving, by the terminal device, a sound effect destruction instruction from the user;
   confirming, by the terminal device, that audio data playing on the first application ends; and
   deleting, by the terminal device, the first sound effect plug-in according to the sound effect destruction instruction.

7. The method according to claim 1, wherein the first multimedia data includes audio and video.

8. The method according to claim 1, wherein the second multimedia data includes audio and video.

9. The method according to claim 1, wherein the first sound effect plug-in is obtained from a third application comprised in the terminal device.

10. The method according to claim 1, wherein the terminal device comprises a sound effect list, and wherein the sound effect list stores a plurality of sound effect identifiers corresponding to a plurality of sound effect plug-ins and access information of each of the plurality of sound effect plug-ins.

11. The method according to claim 1, wherein the method further comprises:
   detecting, by the terminal device, that a current routing mode is a speaker mode; and
   setting, by the terminal device, the value of the sound effect parameter included in the first sound effect plug-in based on the speaker mode.

12. The method according to claim 1, wherein the parameter setting instruction is received while the terminal device is processing the first multimedia data or the second multimedia data by using the first sound effect plug-in.

13. The method according to claim 1, wherein the method further comprises:
   displaying, by the terminal device, the first sound effect option after the first application or the second application is opened.

14. The method according to claim 1, wherein the method further comprises:
   detecting, by the terminal device, that a headset is inserted and that the headset is a current sound device; and
   adjusting, by the terminal device, a sound effect parameter value in the first sound effect plug-in to make a sound effect adapted to the headset.

15. The method according to claim 1, wherein the method further comprises:
   when processing the first multimedia data or the second multimedia data by using the first sound effect plug-in, receiving, by the terminal device, a sound effect switching instruction used to select a second sound effect, wherein the terminal device comprises a second sound effect plug-in corresponding to the second sound effect; and
   processing, by the terminal device, the first multimedia data or the second multimedia data by using the second sound effect plug-in according to the sound effect switching instruction to play the first multimedia data or the second multimedia data with the second sound effect, wherein the first sound effect plug-in is switched according to a preset sound effect selection policy of a sound playing application program, and the policy sends the sound effect switching instruction based on a label of an audio file.

16. The method according to claim 1, wherein the method further comprises:
   creating, by the terminal device, a sound effect list, wherein the sound effect list stores access information of each one of a plurality of sound effect plug-ins that exist in the terminal device, wherein the plurality of sound effect plug-ins are not registered when the terminal device is powered on, wherein when a sound playing application program runs at an application layer of the terminal device, a sound effect plug-in belonging to the sound playing application program is registered with a system layer of the terminal device, and wherein the system layer of the terminal device stores a handle of the sound effect plug-in in the sound effect list.

17. A terminal device, comprising:
   at least one processor;
   a display;
   an input device; and
   a storage coupled to the at least one processor and storing programming instructions for execution by the at least one processor to perform the following operations:
      storing, by using the storage, instructions and data of a first application and a second application that are installed in the terminal device and used to play multimedia data;
      receiving, by using the input device, a first instruction indicating that a user of the terminal device selects a first sound effect option provided by the display, wherein the first sound effect option is an option corresponding to a first sound effect plug-in, wherein the first sound effect plug-in includes a sound effect parameter, wherein the first sound effect plug-in corresponds to a first sound effect, and wherein the first sound effect is a sound effect added to a third application different from the first application or the second application;
      in response to receiving the first instruction, enabling the first sound effect in different applications, wherein the different applications include the first application and the second application;
      after receiving the first instruction, receiving, by using the input device, a parameter setting instruction, wherein the parameter setting instruction is used to set a value of the sound effect parameter, and wherein the value of the sound effect parameter indicates a surround effect of the first sound effect plug-in;
      updating the value of the sound effect parameter in the first sound effect plug-in according to the parameter setting instruction;
      when first multimedia data is to be played by the first application stored in the storage, processing the first multimedia data by using the first sound effect plug-in; and
      when second multimedia data is to be played by the second application stored in the storage, processing the second multimedia data by using the first sound effect plug-in.

18. The terminal device according to claim 17, wherein the programming instructions are for execution by the at least one processor to:
   when processing the first multimedia data or the second multimedia data by using the first sound effect plug-in, receive, by using the input device, a sound effect switching instruction used to select a second sound effect; store, by using the storage, a second sound effect plug-in corresponding to the second sound effect; and
   process, according to the sound effect switching instruction received by the input device, the first multimedia data or the second multimedia data by using the second sound effect plug-in stored in the storage to play the first multimedia data or the second multimedia data with the second sound effect.

19. The terminal device according to claim 17, wherein the programming instructions are for execution by the at least one processor to:
   receive a sound effect enabling/disabling instruction from the user by using the input device; and
   enable or disable the first sound effect plug-in according to the sound effect enabling/disabling instruction received by the input device.

20. A non-transitory computer readable storage medium that stores a program, wherein the program comprises an instruction which, when executed by a terminal device, causes the terminal device to perform operations comprising:

receiving a first instruction indicating that a user of the terminal device selects a first sound effect option, wherein the first sound effect option is an option corresponding to a first sound effect plug-in, wherein the first sound effect plug-in includes a sound effect parameter, wherein the first sound effect plug-in corresponds to a first sound effect, wherein the terminal device comprises a first application and a second application that are used to play multimedia data, and wherein the first sound effect is a sound effect added to a third application different from the first application or the second application;

in response to receiving the first instruction, enabling the first sound effect in different applications, wherein the different applications include the first application and the second application;

after receiving the first instruction, receiving a parameter setting instruction, wherein the parameter setting instruction is used to set a value of the sound effect parameter, and wherein the value of the sound effect parameter indicates a surround effect of the first sound effect plug-in;

updating the value of the sound effect parameter in the first sound effect plug-in according to the parameter setting instruction;

when first multimedia data is to be played by the first application, processing the first multimedia data by using the first sound effect plug-in; and when second multimedia data is to be played by the second application, processing the second multimedia data by using the first sound effect plug-in.

* * * * *

UNITED STATES PATENT AND TRADEMARK OFFICE
CERTIFICATE OF CORRECTION

| | | |
|---|---|---|
| PATENT NO. | : 11,579,835 B2 | Page 1 of 1 |
| APPLICATION NO. | : 16/474596 | |
| DATED | : February 14, 2023 | |
| INVENTOR(S) | : Wenyang Zhang, Hao Liu and Xinggang Gu | |

It is certified that error appears in the above-identified patent and that said Letters Patent is hereby corrected as shown below:

On the Title Page

In Column 2 (Item (57) Abstract) In Line 9, after "option," delete "wherein".

Signed and Sealed this
Thirtieth Day of May, 2023

Katherine Kelly Vidal
*Director of the United States Patent and Trademark Office*